(12) United States Patent
Kaczor

(10) Patent No.: US 8,985,558 B2
(45) Date of Patent: Mar. 24, 2015

(54) DIFFUSER FOR SATURATION OF WATER WITH GAS

(75) Inventor: Marek Kaczor, Krakow (PL)

(73) Assignees: Lukasz Matoga (PL); Kazimiera Smolarek (PL); Marek Kaczor (PL)

( * ) Notice: Subject to any disclaimer, the term of this patent is extended or adjusted under 35 U.S.C. 154(b) by 237 days.

(21) Appl. No.: 13/639,130

(22) PCT Filed: Apr. 6, 2011

(86) PCT No.: PCT/PL2011/050006
§ 371 (c)(1),
(2), (4) Date: Oct. 3, 2012

(87) PCT Pub. No.: WO2011/126388
PCT Pub. Date: Oct. 13, 2011

(65) Prior Publication Data
US 2013/0026109 A1 Jan. 31, 2013

(30) Foreign Application Priority Data

Apr. 7, 2010 (PL) .......................... 390933

(51) Int. Cl.
*B01F 3/04* (2006.01)
*C02F 1/74* (2006.01)

(52) U.S. Cl.
CPC ....................... *C02F 1/74* (2013.01)
USPC .................. 261/94; 261/119.1; 261/121.1

(58) Field of Classification Search
USPC .................. 261/77, 94, 119.1, 121.1, 126
See application file for complete search history.

(56) References Cited

U.S. PATENT DOCUMENTS

| 2,318,728 A * | 5/1943 | Werking ........................ 210/620 |
| 7,195,233 B2 | 3/2007 | Giangrasso ................ 261/122.1 |

FOREIGN PATENT DOCUMENTS

| JP | 2009-39705 | 2/2009 | ............... C02F 1/46 |
| PL | Ru 56212 Y | 1/1995 | |
| PL | P 347752 A | 12/2002 | |

OTHER PUBLICATIONS

Polish Search report in corresponding application No. P390933 received Jun. 2, 2010.
International Search Report in corresponding application No. PCT/PL2011/050006 mailed Sep. 26, 2011.
The Written Opinion of the International Searching Authority in corresponding application No. PCT/PL2011/050006 mailed Sep. 26, 2011.

* cited by examiner

*Primary Examiner* — Robert A Hopkins
(74) *Attorney, Agent, or Firm* — Renner Kenner Greive Bobak Taylor & Weber

(57) ABSTRACT

The subject of the invention is a diffuser for saturation of water with gas, comprising a diffusion element (1) for diffusing the gas run through the diffuser, wherein the diffusion element (1) is made of charcoal. The invention also refers to a set for saturating water with gas, as well as a method for saturation of water with gas, and the use of charcoal as a diffusion element.

20 Claims, 7 Drawing Sheets

DIFFUSER FOR SATURATION OF WATER WITH GAS

TECHNICAL FIELD

The subject of the invention is a diffuser for saturation of water with gas, a device for saturating water with gas, a method of saturation of water with gas and the use of charcoal.

BACKGROUND ART

In the case of water environment such as a pond or a fish tank, its close interconnection with the atmospheric air is essential both to ensure the required amount of oxygen in the water and to prevent a deep deficiency or, the opposite, excessive accumulation of carbon dioxide. The deficiency of carbon dioxide in water reservoirs may occur in conditions of exposure to light during intensive vegetation growth, resulting, among other things, in intensive alkalization of water; whereas the accumulation of $CO_2$ excess may occur at night or due to undesirable excessive fertilization of water with carbon dioxide, which may cause the death of the entire population of fish. Regulation of the concentration of gases such as oxygen or air by means of a thorough aeration of water, as well as regulation of carbon dioxide concentration effectively prevent damage to water environment. Moreover, motion of water caused by diffusing gas bubbles ensures highly favourable, mild, but massive, mixing of the entire water volume. An additional benefit is the acceleration of the process of removal of harmful gases from water. In the case of a fish tank, any columns, draperies or clouds of silvery or white air bubbles hovering in the water (with pulsing pump operation) and constituting an additional, decorative element is not without significance.

Diffusers available on the market, used, for example, for aeration of water, can be divided into several groups. The first one are diffusers made of natural sandstone by carving, usually of a rectangular cuboid shape with rounded edges, with a drilled hole in it, and with a connector pipe connected to a gas entry tube attached to it. The gas introduced into the cuboid penetrates the gaps between the grains of sandstone and is driven out into the water in the form of bubbles.

Another type of diffusers comprise ceramic or glass elements made by sintering small grains of quartz, glass or other materials into a form of a specific shape. This form has a hole equipped with a connector pipe attached to a gas entry tube. Like in the sandstone diffusers, the gas penetrates the spaces between the melted grains and is driven outwards, into the water.

A further type of diffusers is a wooden rectangular cuboid, usually made of lime wood, with a hole in one of the walls (usually the shorter one), equipped with a connector pipe attached to a gas entry tube. The gas introduced into the cuboid interior penetrates the wood along its pores and is driven outwards into the water, usually only through two out of four bigger walls (due to orientation of the tubular pores forming the structure of the wood).

Another group are diffusers made of plastics, produced as a result of perforation of at least one wall of a synthetic element, e.g. a plastic chamber or a tube. In this case, gas introduced into the interior of the element is driven outwards into the water environment through the perforation.

A common feature of the aforementioned diffusers is a big ratio of their total area impenetrable by a gas to the total area of gaps through which the gas may be driven outwards. In all cases, with the exception of a lime wood cuboid, the volume of grains forming the diffuser is much greater than the volume of the gaps between them, the gaps being neither tube-shaped nor oriented. In the case of the lime wood cuboid, the gaps are oriented along the tubular pores forming the structure of the wood, however, the total volume of organic material impenetrable by gas is much greater than the total volume of gaps.

SUMMARY OF INVENTION

The diffuser for saturation of water with gas according to the invention comprises a diffusing element for dispersing the gas passed through the element and is characterized in that the diffusion element is made of charcoal. Preferably, the diffuser comprises a chamber connected to a gas entry tube, wherein the diffusion element allows the gas to exit the chamber. The diffuser may handle any gas, preferably selected from carbon dioxide, oxygen and air.

In one embodiment, the chamber of the diffuser is made entirely of charcoal which constitutes the diffusion material, and preferably the chamber is carved in a lump of charcoal.

In another embodiment, the chamber comprises a casing made of material impenetrable by water and gases, tightly attached to a diffusion element made of a charcoal plate. The casing may be made of a ceramic material, glass, plastic or metal. Preferably, the casing of the chamber constitutes the ceramic bed, on the top of which there is placed a diffusion element in the form of a charcoal plate tightly attached to the casing. In the preferred embodiment, the plate is placed below the upper edges of the casing, with the sides of the ceramic casing reaching above the tightly attached diffusion element.

A set for gas saturation of water according to the invention comprises a pump for pumping the gas, a diffuser containing a diffusion element driving the gas into the water, and a tube for connecting the pump to the diffuser, and is characterized in that the diffusion element is made of charcoal.

The method of saturating water with gas according to the invention consists in passing gas bubbles through the water, wherein the bubbles are formed as a result of passing the gas through the diffuser submerged in water, with the diffusion element of the diffuser being made of charcoal.

The invention also refers to the use of charcoal as a diffusion element in a diffuser for saturating water with gas, preferably carbon dioxide, oxygen or air.

The diffusion element made of charcoal has a structure of tube-shaped pores with a slight volume of coal walls separating them. Such a structure ensures effectiveness significantly higher than that offered by other diffusers available on the market. Charcoal, especially some of its kinds, is capable of producing gas bubbles of the size comparable to that characteristic for diffusers made of lime wood or ceramic materials, however its output is much greater. This results in higher efficiency of saturation of water with air or oxygen. The durability of the material used to build the diffuser ensures its long-term use.

The charcoal diffuser is a perfect solution for introducing carbon dioxide into water, ensuring a significantly higher output than in the case of ceramic or lime wood diffusers. Therefore, a charcoal diffuser, especially if made of charcoal with slightly bigger pores, is also a perfect solution for a massive aeration of water in a fish tank, unlike fine-grained ceramic or lime wood diffusers, which are capable of ensuring only a low-intensity aeration.

BRIEF DESCRIPTION OF THE DRAWINGS

The subject of the invention is presented in its embodiments in the drawing, wherein.

BEST MODE FOR CARRYING OUT THE INVENTION

Figure 1:
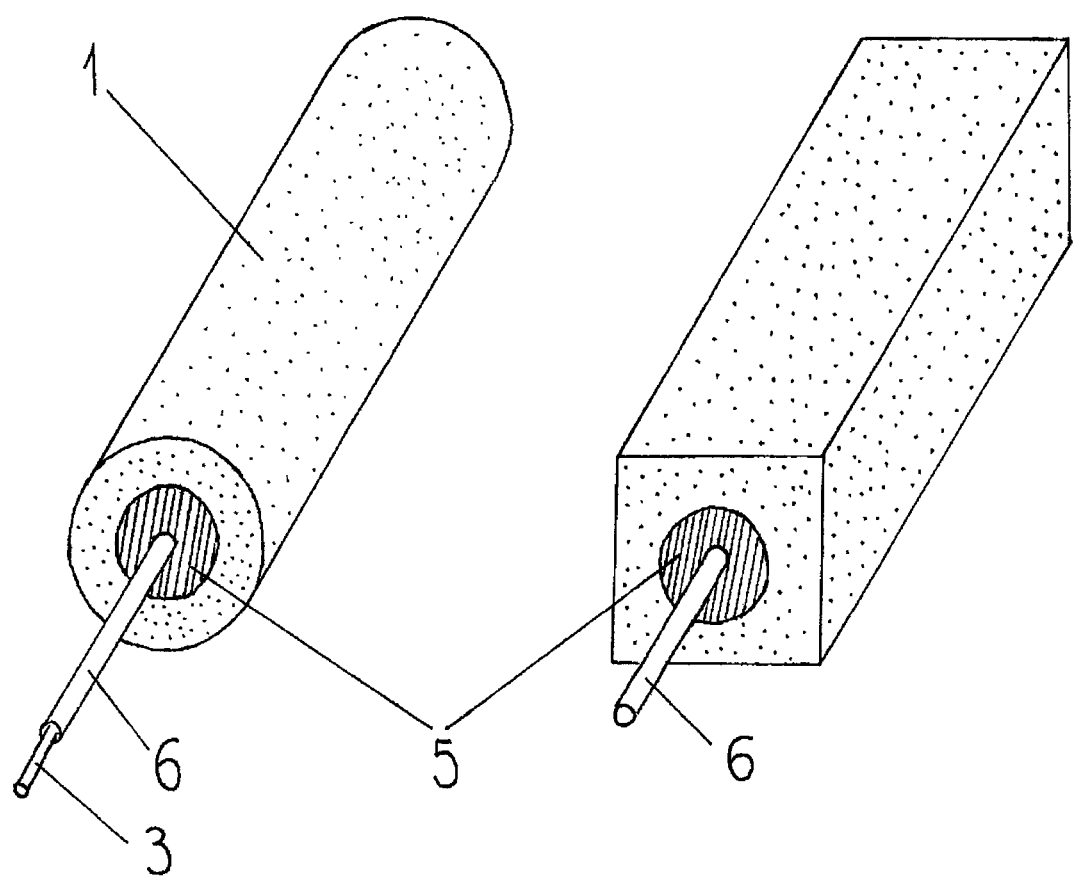
FIG. 1 is a perspective view of a diffuser made entirely of charcoal in two embodiments, FIG. 2—the longitudinal section of the diffuser made entirely of charcoal, with a carved chamber, FIG. 3—the cross-section of the diffuser presented in FIG. 2 in two embodiments, FIG. 4—the cross-section of the diffuser comprising the casing and a tightly attached diffusion element, FIG. 5—the cross-section of the diffuser with a charcoal plate positioned below the upper edges of the casing, with the sides of the ceramic casing reaching above the tightly attached diffusion element, FIG. 6—a perspective view of the diffuser with the ceramic casing without sides reaching above the diffusion element, and FIG. 7—a perspective view of the diffuser with a glass casing without sides reaching above the diffusion element.

The diffuser as presented in FIG. 1, constructed entirely as a diffusion element 1 made of charcoal, has the shape of a cylinder or a rectangular cuboid, with a gas entry tube 3 attached to it through a connector pipe 6 by means of a sealing 5. The gas exits the diffuser through the pores of the diffusion element made of charcoal.

Figure 2:
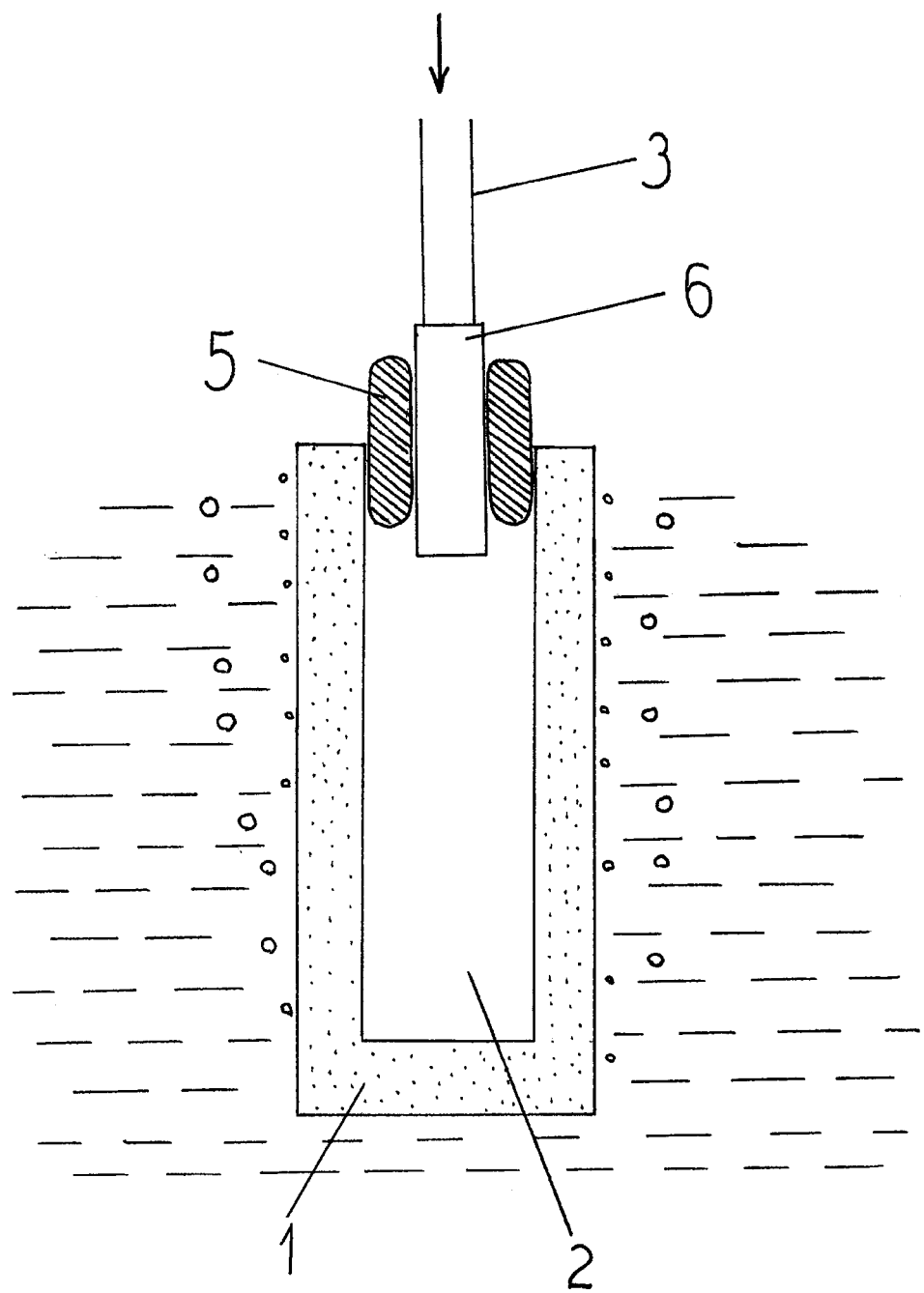
Figure 3:
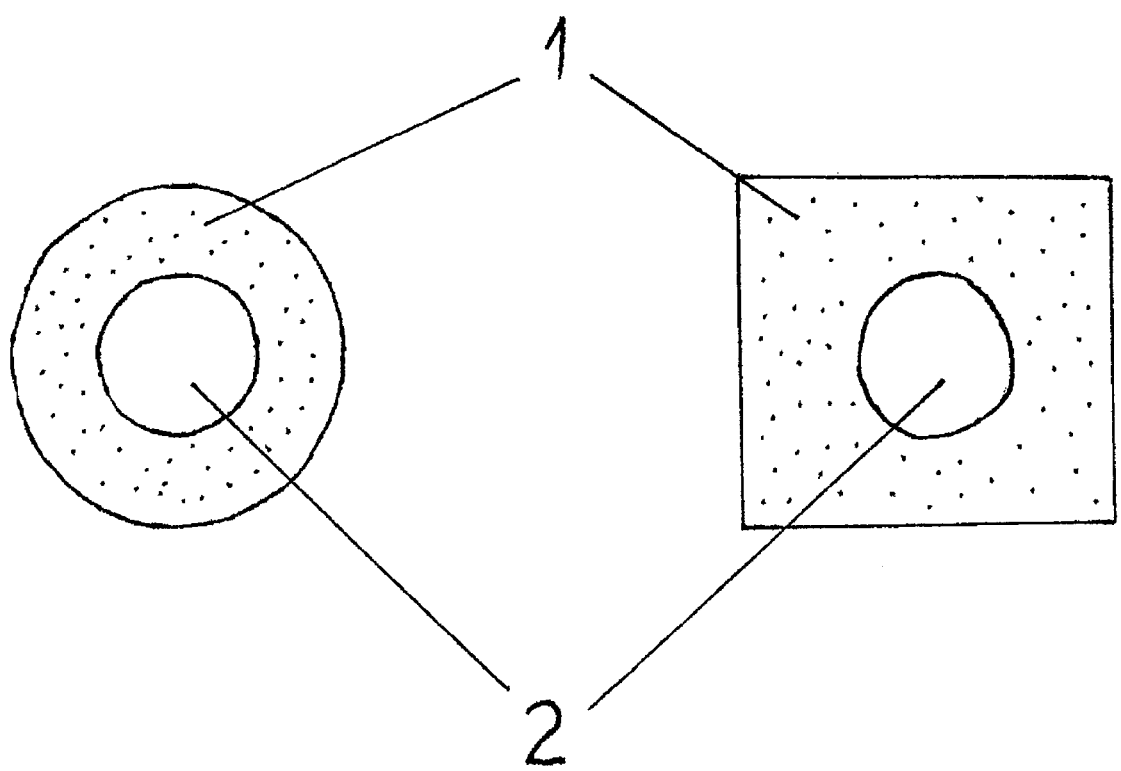

The longitudinal section of the diffuser made entirely of charcoal presented in FIG. 2 shows the embodiment with the carved chamber 2, wherein the gas is introduced through the connector pipe 6, attached by means of the sealing 5, connected to the tube 3. FIG. 3 illustrates the same embodiment in the cross-section, in two variants.

Figure 4:
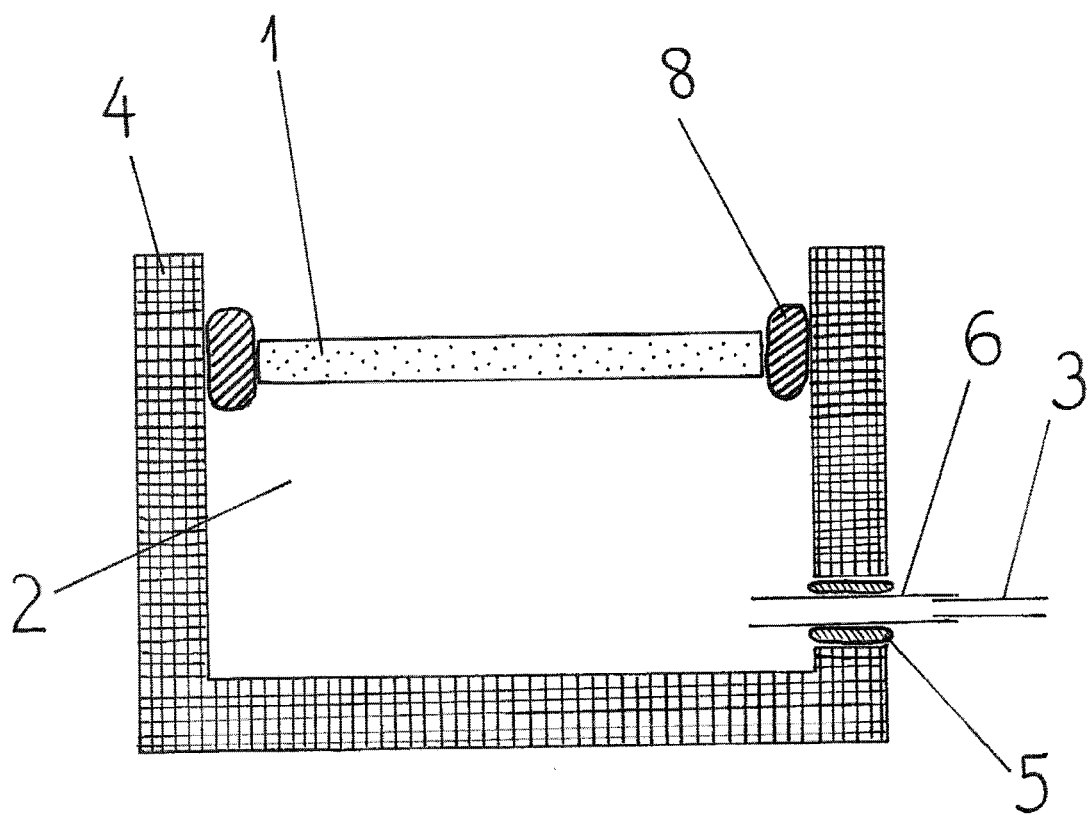

The diffuser presented in FIG. 4 comprises the casing 4 shaped like a bed with closed ends, covered with a plate of the diffusion element 1, attached thereto tightly by means of a sealing 8, thus creating the chamber 2. The connector pipe 6 going through the casing 4 is attached to the gas entry tube 3. The casing can be made of any material impenetrable by water and gas, for example, glass, plastic, metal or ceramic material. The diffusion element may be fixed by means of sealing impenetrable by water, for example, silicone or resinous, such as epoxy resin.

Figure 5:
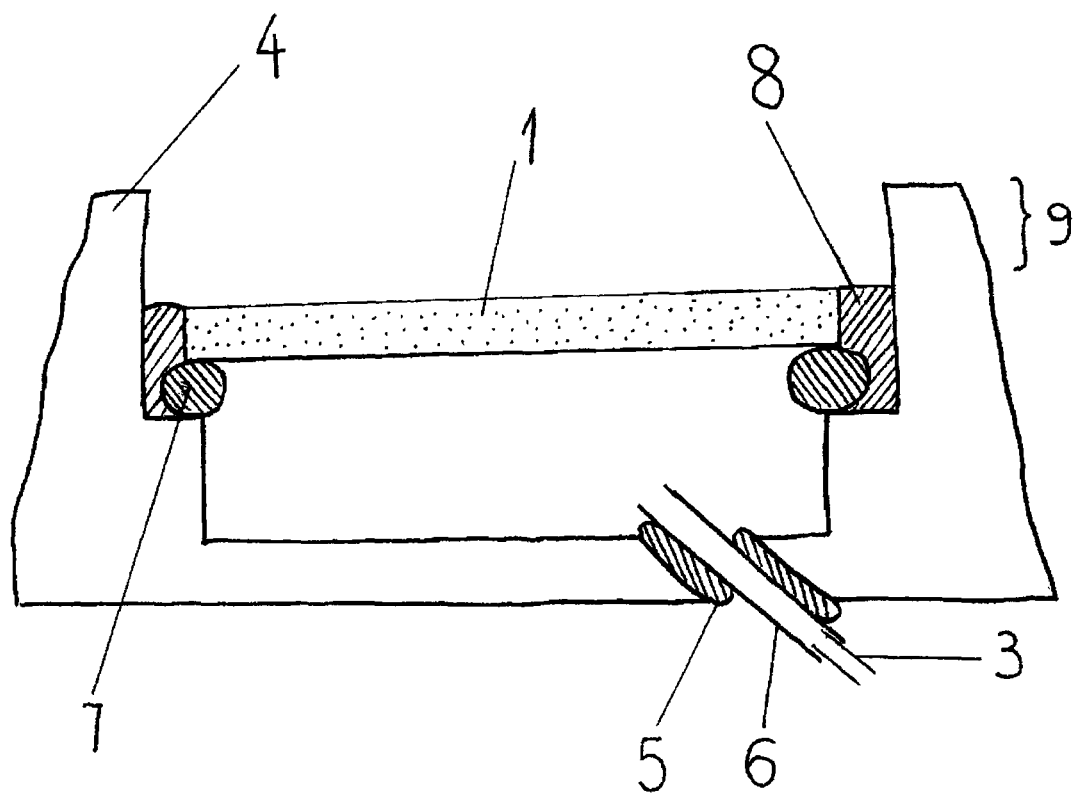

FIG. 5 presents the embodiment of the diffuser with the ceramic casing 4, with sides 9 reaching above the tightly attached diffusion element 1 in the form of a charcoal plate. In this embodiment of the invention the ceramic casing 4 has a fancy ceramic shape imitating underwater rocks, which provides additional aesthetic value of the diffuser when used for aeration of water in a fish tank. The plate of the diffusion element 1 closing the chamber 2 is based on a sealing support 7 made of silicone glue, and is additionally attached by means of an epoxy resin sealing 8. A gas is introduced into the chamber 2 through the connector pipe 6 connected with the gas entry tube. The connector pipe 6 is fixed permanently by means of a gasket 5 made of silicone glue.

Figure 6:
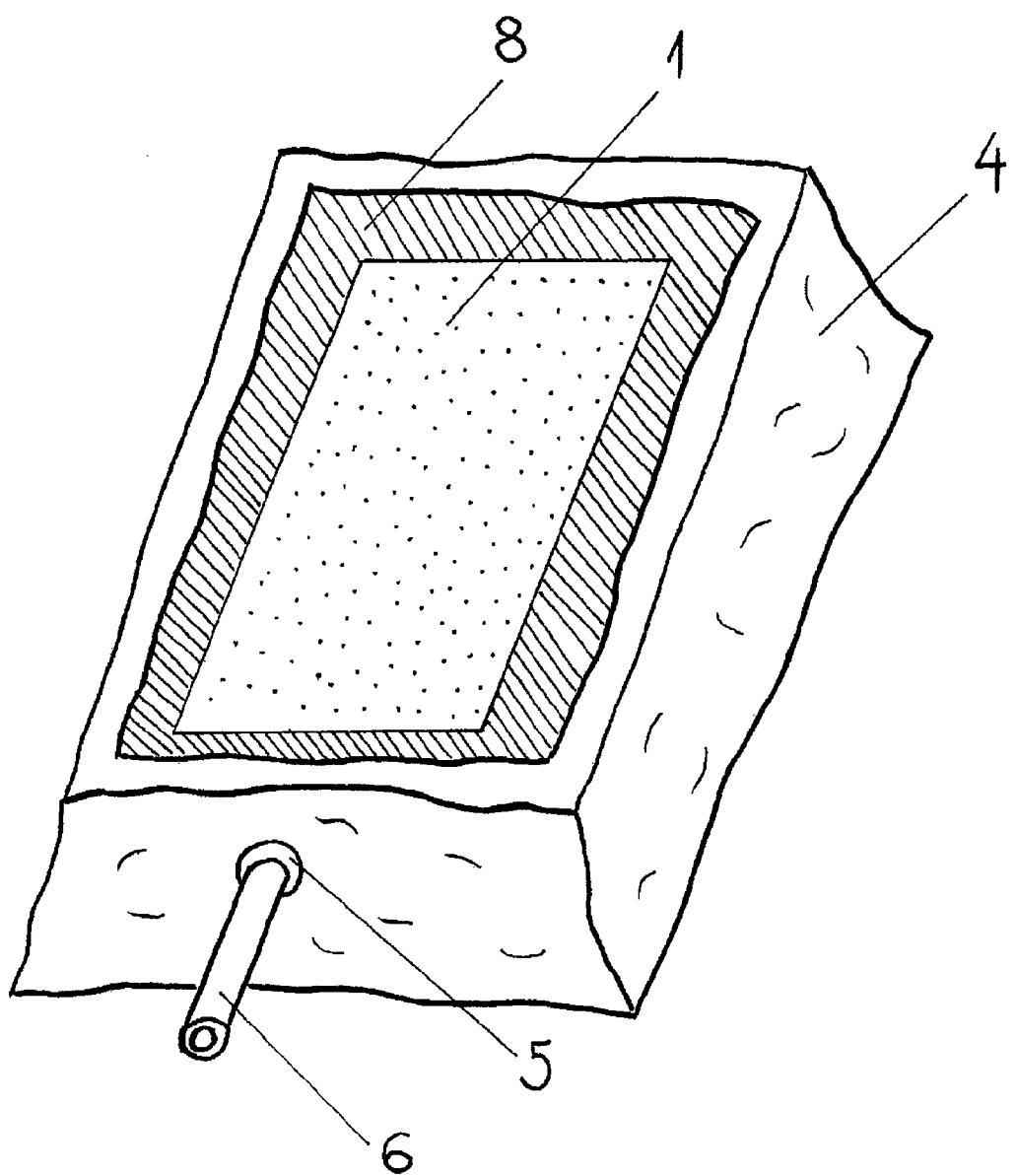

FIG. 6 represents the embodiment with the ceramic casing having a fancy shape of a bed rock covered by the diffusion element 1 made of charcoal—the variant without the sides reaching above the surface of the diffuser. The edges of the charcoal plate are sealed with a frame 8 made of epoxy resin.

Figure 7:
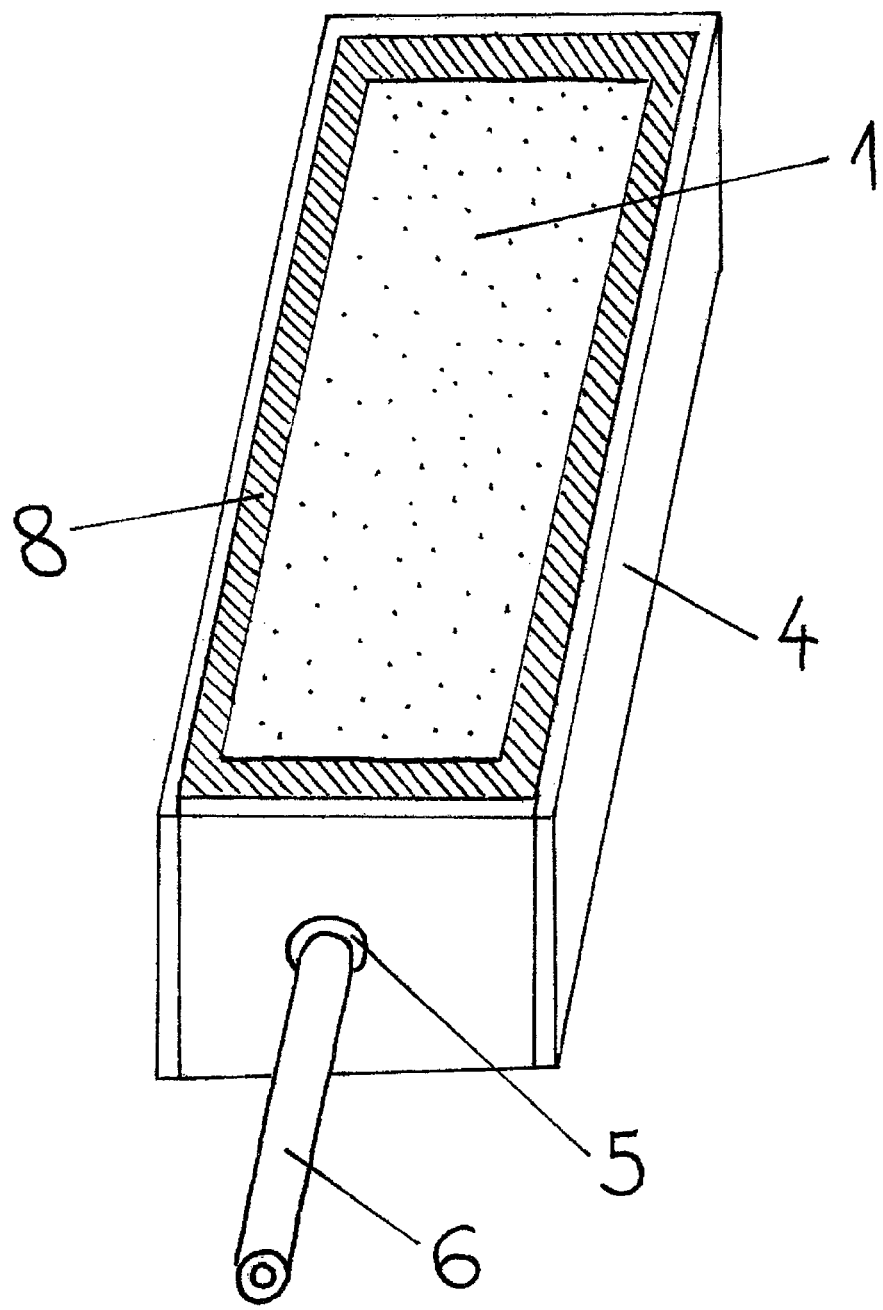

The embodiment presented in FIG. 7 relates to the diffuser with the chamber 2 casing 4 made of glass, into which the gas is introduced through the connector pipe 6 tightly attached to the casing 4. Subsequently, the gas passes through the diffusion element 1 placed on the top of the glass bed and forming its closing. The tightly attached diffusion element prevents the gas from escaping any other way.

In the set for gas saturation of water in water reservoirs according to the invention, a pump forces the gas through the tube 3 into the diffuser submerged in water, equipped, in any of the aforementioned embodiments, with the diffusion element 1 made of charcoal, allowing gas penetration and its release into the water in the form of small bubbles.

In the method of water saturation with gas according to the invention, gas bubbles released from the diffuser being submerged in water are run through the water. The gas pumped into the diffuser is preferably carbon dioxide, air or oxygen. Subjected to pressure, the gas penetrates the charcoal diffusion element of the diffuser and passes into the water diffused into very small bubbles of a large surface of contact with water, thus increasing the efficiency of saturation in comparison with other known solutions.

A commonly encountered disadvantage of small-bubble diffusers is that they quickly get jammed and lose their efficiency. This feature depends on the ratio between the volume of active pores and the volume of the solid body in the material of which the diffuser is made. Due to favourable volume of its pores, the resistance of the charcoal diffuser to this phenomenon is much bigger than in the case of alternative solutions offering similar quality of size reduction of gas bubbles.

In the case of reduction in the efficiency of the charcoal diffuser resulting from its long-term use, it can be very easily regenerated by removing limescale. This can be done by cleaning the pores of sediment and thus restoring the original output of the device. The cleaning is performed preferably by running a mild acid solution through the diffuser. To effect this, a suction pump may be attached to the gas entry tube, and the liquid may be sucked through the diffuser in the opposite direction than during the normal use. The acid solution should preferably be run through the diffuser in several portions to remove limescale both from easily and hardly accessible spots inside the charcoal diffusion element.

Removal of limescale from the diffuser placed in a fish tank can also be performed by using citric acid, without removing the diffusion element from water, by spreading the acid on the surface of the diffuser and then sucking water from the fish tank through the diffuser. This method of removing limescale is particularly effective in the case of a diffuser with sides reaching above the diffusion element. This method is simple and essentially does not cause any risk of disturbance to the water environment of the fish tank.

The invention claimed is:

1. A diffuser for saturation of water with gas, comprising a diffusion element for diffusing the gas run through it, characterized in that the diffusion element is made of charcoal having a structure of tube-shaped pores.

2. A diffuser according to claim 1, characterized in that it comprises a chamber connected to a gas entry tube, wherein the gas can be driven outside the chamber only through the diffusion element.

3. A diffuser according to claim 1, characterized in that the gas run through the diffusion element is selected from carbon dioxide, oxygen and air.

4. A diffuser according to claim 2, characterized in that the chamber is made entirely of charcoal constituting the diffusion material.

5. A diffuser according to claim 4, characterized in that the chamber is carved in the diffusion element made of a lump of charcoal.

6. A diffuser according to claim 2, characterized in that the chamber comprises a casing made of material impenetrable by water and gases, to which the diffusion element in a form of charcoal plate is tightly attached.

7. A diffuser according to claim 6, characterized in that the casing of the chamber is made of ceramic material, glass, plastic or metal.

8. A diffuser according to claim 7, characterized in that the casing of the chamber has the form of a bed made of ceramic material covered with the diffusion element in the form of a charcoal plate tightly fixed to the casing.

9. A diffuser according to claim 8, characterized in that the plate of the diffusion element is tightly fixed below the upper edges of the casing with the sides of the ceramic casing reaching above the diffusion element.

10. A set for saturation of water with gas, comprising a pump for pumping the gas, a diffuser with a diffusion element allowing the gas to be released into the water and a tube for connecting the pump to the diffuser, characterized in that the diffusion element is made of charcoal having a structure of tube-shaped pores.

11. A method for saturation of water with gas, wherein gas bubbles produced as a result of passing the gas through a diffuser submerged in the water are run through the water, characterized in that the gas is passed through the diffuser having the diffusion element made of charcoal having a structure of tube-shaped pores.

12. The method according to claim 11, characterized in that the gas supplied to the diffuser is selected from the group comprising carbon dioxide, oxygen and air.

13. The method according to claim 11, further comprising: running an acidic solution through the diffuser in a direction opposite the gas flow.

14. The method according to claim 11, further comprising: spreading citric acid on the diffuser and then sucking water in which the diffuser is submerged through the diffuser.

15. A diffuser for saturation of water with gas, comprising:
a diffusion element for diffusing the gas run through it, characterized in that the diffusion element is made of charcoal having a structure of tube-shaped pores;
a casing which forms a chamber, said chamber connected to a gas entry tube, wherein the gas can be driven outside the chamber only through the diffusion element, wherein the casing is made of material impenetrable by water and gases, and wherein the diffusion element is in a form of a charcoal plate and is tightly attached to the casing.

16. A diffuser according to claim 15, characterized in that the gas run through the diffusion element is selected from carbon dioxide, oxygen and air.

17. A diffuser according to claim 16, characterized in that the chamber is carved in the diffusion element made of a lump of charcoal.

18. A diffuser according to claim 15, characterized in that the casing of the chamber is made of ceramic material, glass, plastic or metal.

19. A diffuser according to claim 18, characterized in that the casing of the chamber has the form of a bed made of ceramic material covered with the diffusion element in the form of a charcoal plate tightly fixed to the casing.

20. A diffuser according to claim 19, characterized in that the plate of the diffusion element is tightly fixed below the upper edges of the casing with the sides of the ceramic casing reaching above the diffusion element.

* * * * *